J. D. RAMSEY.
LATHE TOOL HOLDER.
APPLICATION FILED FEB. 9, 1909.

935,547.

Patented Sept. 28, 1909.

Witnesses:
Sydney E. Taft
Franklin E. Low

Inventor:
Joseph D. Ramsey,
by his attorney

UNITED STATES PATENT OFFICE.

JOSEPH D. RAMSEY, OF DORCHESTER, MASSACHUSETTS.

LATHE-TOOL HOLDER.

935,547.

Specification of Letters Patent. Patented Sept. 28, 1909.

Original application filed September 24, 1908, Serial No. 454,588. Divided and this application filed February 9, 1909. Serial No. 476,919.

*To all whom it may concern:*

Be it known that I, JOSEPH D. RAMSEY, a citizen of the United States, residing at Dorchester, in the county of Suffolk and State of Massachusetts, have invented new and useful Improvements in Lathe - Tools and Holders, of which the following is a specification.

This invention relates to an improved lathe tool and holder, the subject matter of the present application having been shown and described in a former application filed by me September 24, 1908, Serial No. 454,588, and the object is to provide means whereby the holder may be easily and quickly adjusted in the tool post of the lathe so that the upper face of the tool may be placed exactly level, such adjustment having been heretofore accomplished only very imperfectly and tediously by means of a surface gage resting on a block placed upon the ways of the lathe bed, and the object is further to provide a tool and holder of the character described so constructed and arranged that when once the holder is leveled the tool may be removed therefrom from time to time, sharpened and returned to its place in the holder with the absolute assurance to the user that the upper face of the tool is exactly level.

The invention consists in the novel features of construction and in the combination and arrangement of parts set forth in the following specification and particularly pointed out in the appended claims.

Figure 1:
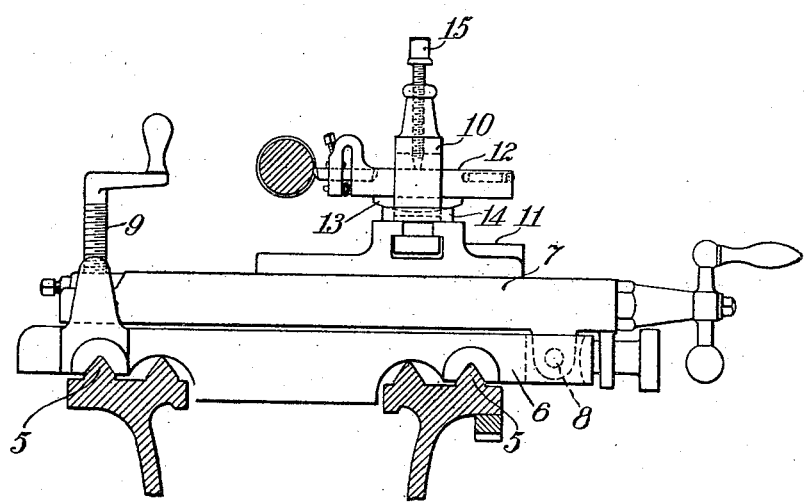
Figure 2:
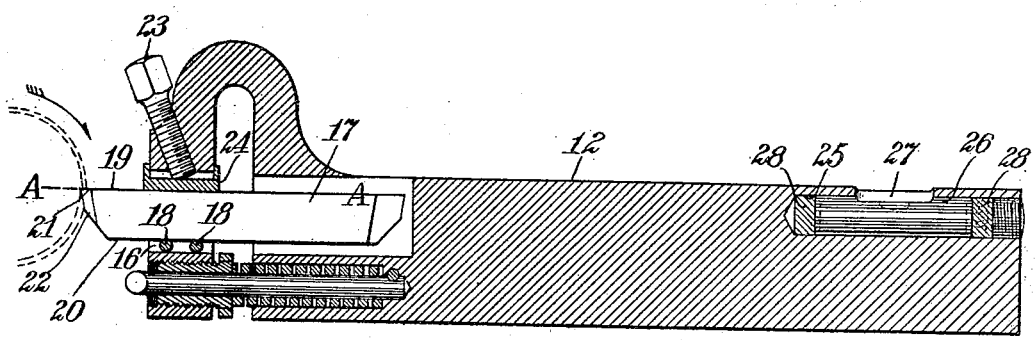

Referring to the drawing: Figure 1 is a cross section of a lathe showing the carriage thereof in elevation, upon which carriage is supported a tool post having secured therein a tool and holder embodying my invention, the tool being illustrated as operating upon a piece of work. Fig. 2 is a vertical longitudinal section of the holder, the tool being shown in elevation therein.

In the drawing, 5, 5 are the ways of a lathe upon which is supported a carriage 6 on which is mounted a support 7 mounted on a pivot 8, there being provided an adjusting screw 9, whereby said support may be rocked about its pivot to raise and lower a tool post 10 mounted upon a cross slide 11 all of which is well known to those skilled in the art. In the tool post 10 is mounted a tool holder 12 forming a part of my invention, said holder being supported upon a segmental plate 13 mounted upon a recessed washer 14 of usual construction, this being a common construction to accomplish the leveling of lathe tools, the arrangement being such that said segmental plate may be rocked upon the washer and when the tool is properly positioned the same is clamped by means of a set screw 15 adapted to bear against the upper side of the tool holder 12.

In doing screw cutting with a lathe especially where a very fine accurate work is desired, as in the case of the manufacture of taps, it is very essential that the upper face of the screw cutting tool shall lie in a plane A—A containing the axis of the work. Any inaccuracy in the placing of the tool causes an imperfect thread to be cut upon the screw. Heretofore, such adjustment has been accomplished by means of a surface gage placed upon a parallel block resting upon the ways of the lathe bed, the point of the surface gage being placed upon the ground upper face of the tool immediately adjacent to the point thereof for it will be evident that the shank of the tool or holder being an unfinished surface cannot be used for this purpose especially since the same is not necessarily parallel with the upper face of the tool, which is immediately adjacent to the point thereof. Such a method of leveling the tool is necessarily very slow and tedious owing to the fact that the upper surface of the tool which is tested by the surface gage is very short and because of the fact that it is not only necessary to manipulate the surface gage, but also to manipulate the adjusting screw 9, the segmental plate 13 and the clamping screw 15. There is also the further inconvenience that from time to time during the cutting of the thread it becomes necessary to grind the tool, this necessitating its removal after which the adjustment must be once more made.

I will now proceed to describe the novel features of construction of my improved tool and holder whereby the difficulties just described are eliminated. In a hole 16 in the tool holder 12 is mounted a tool 17 supported upon two pins 18, 18 passing through said hole transversely thereof and terminating in said holder. The tool 17 is provided with two finished faces 19 and 20 which are absolutely parallel with each other. A cutting edge 21 is formed by the intersection of one or more faces 22 with the face 19 as is common with screw cutting tools. The tool 17 is rigidly clamped against the pins 18, 18 by means of a clamping screw 23 adapted to force a clamping block 24 against the upper edge of said tool. The tool holder 12 is provided with a horizontal hole 25 drilled thereinto from the right hand or rear end thereof, in which hole is located a spirit level consisting of a transparent tube 26 having therein a body of fluid which partially fills the same so as to leave an air bubble, as in the case of a spirit level. Above the tube 26 there is provided an aperture 27 through which the bubble may be viewed. Two pieces of cork 28, 28 are located at opposite ends, respectively, of the tube 26. In the manufacture of the tool holder the same is placed in a jig so constructed that it is possible to drill a hole 25 parallel to a plane tangent to the holes for the pins 18, 18 so that when the tool 17 is clamped against said pins it is absolutely certain that the upper face 19 of said tool will be in parallelism with the hole 25 and, therefore, when the air bubble is in the middle of the tube 26 it will be evident that the face 19 will be absolutely level. The tool is adjusted so that its upper face will lie in a plane containing the axis of the work, this being accomplished in a well known manner by setting the tool to the lathe center.

Having in mind the slow and tedious method of adjusting the tool which has heretofore been employed, the advantages derived from the use of my improved tool and holder will be obvious. When the tool and tool holder are once adjusted the tool may be removed from the holder from time to time and its face or faces 22 ground to sharpen the same, it being understood that the face 19 remains untouched. When the tool is returned to the holder and clamped in place therein it will be readily apparent that the upper face thereof will be absolutely level without further adjustment.

Having thus described my invention, what I claim and desire by Letters Patent to secure is:

1. The combination in a lathe of a tool post, a tool holder secured to said tool post, a lathe tool detachably attached to said holder, said tool having a cutting edge formed by the intersection of two faces, and a device supported on said holder for indicating the level of one of said faces.

2. The combination in a lathe of a tool post, a tool holder secured to said tool post, a lathe tool detachably attached to said holder, said tool having a cutting edge formed by the intersection of two faces, and a spirit level supported on said holder in parallelism with one of said faces.

In testimony whereof I have hereunto set my hand in presence of two subscribing witnesses.

JOSEPH D. RAMSEY.

Witnesses:
Louis A. Jones,
Sadie V. McCarthy.